Patented June 8, 1943

2,321,037

UNITED STATES PATENT OFFICE 2,321,037

HYDRATION OF HALOGENATED EPOXIDES

Kenneth E. Marple and Theodore W. Evans, Oakland, Calif., assignors to Shell Development Company, San Francisco, Calif., a corporation of Delaware No Drawing. Application April 26, 1940, Serial No. 331,802

5 Claims. (Cl. 260—633)

The present invention is concerned with the hydration of halogenated epoxides, and pertains to an improved process whereby halogenated epoxides of the type herein specified may be effectively converted to valuable hydroxy compounds. More particularly, the invention comprises an improved process whereby halogenated epoxides, containing at least one epoxy group

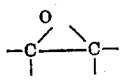

(the carbon atoms of which are non-tertiary), are reacted with water in the presence of an acid or acid-acting catalyst, at moderately elevated temperatures, to produce high yields of useful halogenated polyhydric alcohols.

Although the invention is particularly concerned with and applicable to the catalytic hydration of epichlorhydrin, the general group or class of compounds which may be hydrated in accordance with the principles of the present invention comprise the halogenated epoxides which contain at least one epoxy group, the carbon atoms of which are each linked directly to not more than two carbon atoms, and at least one halogen atom which may or may not be linked to a carbon atom embraced in an epoxy group. The loose bonds of the epoxy group of such epoxy group may be taken up by hydrogen, halogen, hydroxyl, alkyl, alkoxy, alkenyl, carbocyclic, heterocyclic, aralkyl, aralkoxy and/or other suitable radicals which may or may not be further substituted, provided, however, that at least one of these loose bonds of each carbon atom embraced in such epoxy group must be taken up by either a hydrogen or a halogen atom. In other words, these carbon atoms of the epoxy group are either primary or secondary.

Suitable halogenated epoxy compounds which may be employed in effecting the present invention include compounds of the type of

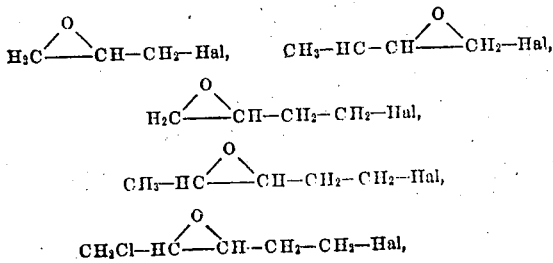

and the like, and their homologues, analogues and suitable substitution products.

Another suitable class of halogenated epoxides includes those containing at least one epoxy group wherein the carbon atoms embraced in the epoxy group are non-tertiary, and wherein at least one such epoxy carbon atom is linked directly to a halogen atom. This group of halogenated epoxides includes compounds such as

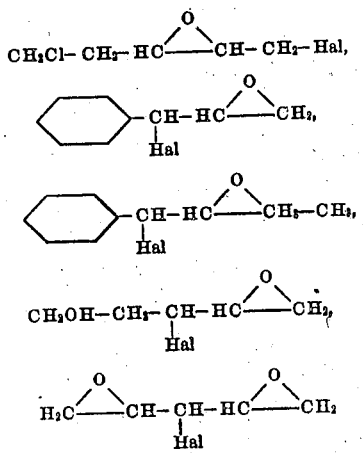

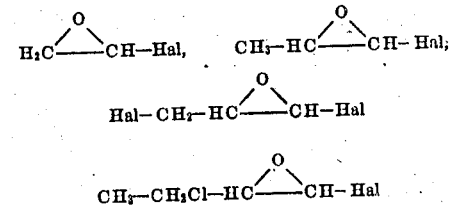

and the like, and their homologues, analogues and suitable substitution products, whether or not they are open chain compounds or heterocyclic, carbocyclic or aralkyl type derivatives.

When the halogenated epoxide treated in accordance with the present process does not possess a halogen atom linked directly to a carbon atom embraced in an epoxy group, the main reaction product is a halogenated polyhydroxy alcohol. Halogenated epoxides containing a halogen atom linked directly to an epoxy carbon atom yield hydroxy-carbonylic compounds which may be considered as aldols or ketols depending on whether the halogen atom is attached, respectively, to a primary or secondary epoxy carbon atom. The hydroxy-carbonylic compounds thus produced in accordance with the process of the present invention are characterized by possessing a carbonyl group and a hydroxyl group linked to adjacent carbon atoms.

It is known that halogenated epoxides, such as epichlorhydrin and its homologues, analogues and suitable substitution products, may be subjected to catalytic hydration to produce the corresponding useful halogenated polyhydric alcohols, halogenated hydroxy substituted glycols or hydroxy-carbonylic compounds, the character of the final product, as noted above, depending on the nature of the halogenated epoxide subjected to such catalytic hydration. Generally speaking, this catalytic hydration consists in commingling and reacting the halogenated epoxide, preferably at a temperature within the range of from about 25° C. to 100° C. with water in the presence of relatively small amounts of an acid-acting catalyst of the type more fully described hereinbelow. These reactions have been heretofore effected by using an excess of water over the epoxide applied, the water to epoxide mol ratio being usually in the neighborhood of from 3:1 to about 5:1. After the termination of the reaction, and when it was desired to recover an anhydrous or substantially anhydrous product, the reaction mixture was first subjected to a neutralization step, and the water was then separated by any suitable means, such as distillation, extraction, use of drying agents, etc., the choice of the specific method of recovery being dependent, inter alia, on the nature of the product or products to be recovered.

It has now been discovered, however, that the above-described process, particularly when applied to epihalohydrins and, to a somewhat lesser extent, to the halogenated epoxides containing primary and/or secondary carbon atoms embraced in the epoxy group, results in the production of relatively low yields of the desired halogenated polyhydric alcohols and the like, the reaction products containing excessive quantities of products of polymerization and/or other undesirable products of various side reactions. Furthermore, it has been discovered that the aqueous phase, particularly when removed from the reaction mixture by the well-known distillation method, contains a small but well-defined quantity or percentage of the desired reaction product, the recovery of which by any of the known means is impractical and uneconomical.

The present invention provides an improved process which avoids the above and other defects of the known methods for the catalytic hydration of the above-defined class of halogenated epoxides, the use of this new process resulting in the production and recovery of the halogenated polyhydric alcohols, and the like, in yields which have been heretofore unattainable. More specifically, the present process is applicable to the efficient and highly economical conversion of epihalohydrins to the corresponding glycerine monohalohydrins, and to the recovery of high yields of these monohalohydrins from the reaction mixtures.

In one of the specific embodiments, the invention resides in effecting the hydration reaction while maintaining a very high water-to-epoxide mol ratio, this ratio, at least in the case of the catalytic hydration of epihalohydrins, being about 10:1 and even higher. Also, in order to control the hydration reaction, it is preferable to introduce the halogenated epoxide gradually into the acid-containing water, thereby allowing an even and controllable hydration of the primary material. Therefore, in accordance with a preferred mode of operating according to the present invention, the hydration reaction is effected by establishing a relatively large body of water containing the acid-acting catalyst, maintaining this aqueous solution at the described optimum temperature, and gradually introducing, with stirring, the halogenated epoxide, the quantity of the epoxide thus added being regulated so that the mol ratio of the water to the total halogenated epoxide introduced into the reaction vessel is at least, and preferably exceeds about 10:1. After the addition of all of the halogenated epoxide, the mixture is continuously agitated and maintained at the aforementioned moderate temperature for a period of time sufficient to allow the hydration reaction to occur, after which the desired products are separately recovered if it is preferred to obtain them in an anhydrous state.

As noted above, the obtained reaction mixture may be first neutralized by the addition of an amount of a basic or basic-acting material, such as calcium carbonate, in a slight excess to the acid catalyst employed. As neutralizing agents it is preferable to employ basic or basic-acting materials which are in themselves insoluble or substantially insoluble in the reaction mixture, and which form insoluble or substantially insoluble salts. The neutralized reaction mixture may then be distilled, preferably under a reduced pressure. The aqueous phase obtained as the overhead distillate, contains some of the halogenated polyhydric alcohols which, apparently, are not carried over with the water vapors since tests conducted, under varied conditions, for example on the distillation of mixtures of glycerol monochlorhydrin and of water, have indicated that no constant boiling mixtures are obtained but that, on the contrary, the two substances can be readily and substantially quantitatively separated from each other by such distillation. Without any intention of being limited by any theory of the case, it is believed that the presence of the halogenated polyhydric alcohols and the like in the water distillate is due to the distillation of the unreacted halogenated epoxide (which may or may not have been dissolved in the acidified water in the hydration reaction zone) together with the water, and the subsequent slow hydration of such epoxide in the water distillate. Whatever may be its cause, it has been definitely established that the water distillate obtained by the distillation of the neutral reaction mixture contains a noticeable percentage of the halogenated polyhydric alcohols or the like, this percentage, in the case of glycerine monochlorhydrin, being in the neighborhood of 2% to 5%, and even more. The present process includes the step of re-using this water for the subsequent hydration of additional quantities of halogenated epoxides of the described class, it being discovered that this water does not contain any appreciable amounts of other substances, that there is no accumulation of undesirable materials, and that repeated re-use of such water distillate does not materially, if at all, increase its content of the desired halogenated reaction products (e. g. halogenated polyhydroxy compounds). Obviously, this allows a greatly increased overall yield of such desired reaction products. Still another advantage of the above-described process of operation resides in the fact that the reaction mixture contains only very small percentages of the undesirable by-products of the type of products of polymerization.

The following examples are introduced for the purpose of illustrating the advantages derived from effecting the catalytic hydration reaction according to the process of the present invention, it being understood that there is no intention of being limited by these examples since the scope of the invention is co-extensive with the appended claims.

Example I

About 14 mols (250 grams) of water containing 0.5 c. c. of concentrated sulfuric acid were placed in a reaction vessel provided with a stirrer. The aqueous solution was heated to about 90° C. and was maintained at this temperature throughout the reaction. Approximately 4 mols (370 grams) of epichlorhydrin were gradually introduced to the stirred and heated aqueous solution, the addition being made over a period of about one hour. Thereafter, the reacted mixture was cooled and neutralized by the addition of barium hydroxide. The neutral reaction mixture was then distilled under a reduced pressure.

Glycerin monochlorhydrin was obtained in a yield of about 79.3% of the theoretical, while the bottoms (calculated as glycerol) amounted to about 21.0%.

Example II

About 100 mols of water containing 1.85 grams of concentrated sulfuric acid (0.2% by weight of the epichlorhydrin subsequently added) were heated to and maintained at a temperature of approximately 90° C. While continuously agitating this solution about 10 mols of epichlorhydrin were added gradually over a period of about one hour, at the end of which addition the heating was continued for another thirty minutes. Thereafter, the reacted mixture was cooled, neutralized and distilled in the same manner as employed in Example I. Glycerine monochlorhydrin was obtained in a yield of between about 90.5% and 91.0%.

A comparison of the two examples shows that an increase in the water-epichlorhydrin mol ratio from about 3.5:1 to 10:1, increased the glycerine monochlorhydrin from 79.3% to about 91%, or an increase of approximately 14.6%. The yield of recoverable monochlorhydrin is further increased, in accordance with the invention, by employing the water distillate as make-up water for the catalytic hydration of further quantities of epichlorhydrin. Since this water distillate usually contains from about 2% to 5% of the monochlorhydrin, the total over-all recoverable glycerine monochlorhydrin yield, when employing a 10:1 mol ratio, is thus between about 93% and 96% of the theoretical. Further increases may be realized by using still higher water-epichlorhydrin mol ratios.

The hydration reaction may be effected within a relatively wide temperature range. Preferably, the reaction is executed in a temperature range of from about 25° C. to about 100° C. However, higher temperatures and shorter times of contact of the reactants may be resorted to when it is desirable to accelerate the reaction. Usually at temperatures substantially above 100° C., when not employing superatmospheric pressures, the yield of the desired product is decreased due to the fact that the reaction products, particularly the halogenated alcohols, may be converted to carbonylic compounds under the conditions of the hydration reaction. However, in some cases the reaction may be effected by refluxing the reaction mixture at its boiling temperature under atmospheric pressure. When it is desired to operate at temperatures above the boiling temperature of the reaction mixture, resort may be made to superatmospheric pressures.

The present invention may be executed in a batch, intermittent or continuous manner. In a preferred batch mode of operation, the halogenated epoxide to be hydrated may be gradually introduced into and contacted with an aqueous acid or acid-acting catalyst solution. The reaction mixture may be agitated and, if desired, refluxed at its boiling temperature until the reaction is substantially complete. The reacted mixture which comprises the reaction product, water and acid-acting catalyst may be separated by any suitable means, such as the above-outlined neutralization of the acid-acting catalyst and the distillation of the mixture to obtain high yields of the desired reaction product.

As a catalyst for the hydration of the halogenated epoxides of the class described herein, it is possible to use a suitable acid, acidic salt, acid-reacting substance or a substance capable of acting as an acid catalyst under the conditions of operation and when in contact with the reactants in the reaction medium. Suitable catalysts which may thus be employed include the strong mineral acids, such as sulfuric acid, phosphoric acid, metaphosphoric acid, phosphorous acid, pyrophosphoric acid, pyrosulfuric acid, nitric acid, perchloric acid, and the like. Mineral acid constituents, such as sulfuric oxychloride, sulfurous oxychloride, sulfurous oxybromide (thionyl bromide), nitrogen dioxide, nitrogen trioxide, nitrosyl chloride, phosphorous oxychloride, phosphorous trichloride, phosphorous pentachloride, and the like, as well as suitable inorganic acid-acting salts, such as zinc sulphate, zinc phosphate, ferric sulfate, aluminum sulfate, sodium acid sulfate, sodium acid phosphate, and like compounds, may also be used. Also, it is possible to employ monobasic organic acids, such as formic, acetic, propionic, butyric, isobutyric, valeric, benzoic, and their homologues and analogues, as well as polybasic acids, such as oxalic, malonic, succinic, and the like, or hydroxyl and/or carbonyl substituted acids, such as lactic, citric, malic, mesoxalic, or the like. Furthermore, it is also possible to use organic esters, salts and compounds capable of acting as acid catalysts under the conditions of operation. As such, reference may be made to benzene sulfonic acid and its homologues and analogues, dialkyl and alkyl acid sulfates, alkylated phosphoric and sulfonic acids, halogenated organic acids, acids such as sulpho-acetic, etc., acid halides and compounds such as aniline-hydrochloride and the like. It is obvious that the above acids and acid-acting substances do not possess the same catalytic power because this catalytic power of the catalyst depends, in part, on its acid strength, as well as on the operating temperature. The weaker the acidity of the catalyst employed, the lower is its catalytic power. Accordingly, all other conditions being equal, the use of a weaker acid catalyst ordinarily requires its application in higher concentrations or operation under higher temperatures in order to obtain the same degree of catalytic activity. When the present invention is applied to the hydration of epihalohydrin and its homologues, i. e. halogenated epoxides wherein neither of the carbon atoms in an epoxy group is tertiary, it is preferred to use the strong mineral acid catalysts. However, the choice of the particular catalyst to be employed is determined by the particular reactant employed and by the method to be employed in recovering the reaction product.

The halogenated polyhydroxy compounds prepared according to the process of the present invention may be used for numerous solvent and extraction purposes. They may be used as the primary materials in the preparation of glycols, glycerols, esters, ethers, carboxylic acids and the like, as well as for the production of valuable carbonylic compounds.

We claim as our invention:

1. A process for the conversion of epichlorhydrin to glycerine monochlorhydrin, which comprises the steps of establishing a body of water containing an acid-acting catalyst, maintaining said acid-containing water in a state of agitation at an elevated temperature but below its boiling point, gradually introducing the epichlorhydrin into said heated body of water, maintaining at least a 10 to 1 mol ratio of water to epichlorhydrin throughout the reaction, thereby effecting an efficient hydration of the epichlorhydrin to glycerine monochlorhydrin, subsequently neutralizing the acid-acting catalyst, subjecting the neutralized reaction mixture to a vacuum distillation to recover separately an aqueous phase and the glycerine monochlorhydrin, and employing the aqueous phase for the establishment of further acidified bodies of water for the hydration of additional quantities of epichlorhydrin, thereby obtaining high overall yields of glycerine monochlorhydrin.

2. The process according to claim 1, wherein a small percentage of a mineral acid is employed as the acid-acting catalyst which is present in the body of water, said mineral acid acting as the hydration promoting catalyst.

3. A process for the conversion of epichlorhydrin to glycerine monochlorhydrin, which comprises the steps of establishing a body of water containing an acid-acting catalyst, maintaining said water in a state of agitation at an elevated temperature but below its boiling point, gradually introducing the epichlorhydrin into said heated body of water, maintaining at least a 10 to 1 mol ratio of water to epichlorhydrin throughout the reaction, thereby effecting an efficient hydration of the epichlorhydrin, subsequently neutralizing the acid-acting catalyst, and subjecting the neutralized reaction mixture to a vacuum distillation to recover high yields of the glycerine monochlorhydrin.

4. A process for the conversion of epihalohydrin to the corresponding glycerine monohalohydrin, which comprises reacting epihalohydrin with water containing an acid-acting catalyst, said acidified water being employed in a quantity of at least 10 mols of water per mol of the epihalohydrin, effecting said reaction at an elevated temperature for a period of time sufficient to effect the hydration of the epihalohydrin, and recovering the glycerine monohalohydrin from the reaction mixture.

5. The process according to claim 4, wherein the glycerine monohalohydrin is recovered from the reaction mixture by neutralization of the acid-acting catalyst therein and by subjecting the neutralized mixture to distillation whereby an aqueous phase and the glycerine monohalohydrin are separately distilled over, and wherein the aqueous phase, after the addition of an acid-acting catalyst, is employed, in the above stated mol ratios, for the hydration of additional quantities of epihalohydrin.

KENNETH E. MARPLE.
THEODORE W. EVANS.